United States Patent
Monsifrot et al.

(10) Patent No.: US 9,378,395 B2
(45) Date of Patent: Jun. 28, 2016

(54) METHOD, A DEVICE AND A COMPUTER PROGRAM SUPPORT FOR EXECUTION OF ENCRYPTED COMPUTER CODE

(71) Applicant: THOMSON LICENSING, Issy de Moulineaux (FR)

(72) Inventors: Antoine Monsifrot, Rennes (FR); Charles Salmon-Legagneur, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 15 days.

(21) Appl. No.: 13/915,607

(22) Filed: Jun. 11, 2013

(65) Prior Publication Data

US 2013/0332746 A1 Dec. 12, 2013

(30) Foreign Application Priority Data

Jun. 12, 2012 (EP) .................................. 12305667

(51) Int. Cl.
 *G06F 21/72* (2013.01)
 *G06F 21/75* (2013.01)
(52) U.S. Cl.
 CPC ............... *G06F 21/72* (2013.01); *G06F 21/75* (2013.01)
(58) Field of Classification Search
 None
 See application file for complete search history.

(56) References Cited

U.S. PATENT DOCUMENTS

| | | | |
|---|---|---|---|
| 7,210,134 B1 | 4/2007 | Langer | |
| 7,293,266 B2 | 11/2007 | Safa | |
| 7,937,365 B2 * | 5/2011 | Prahlad et al. | 707/640 |
| 8,843,417 B2 * | 9/2014 | Hammad | 705/64 |
| 2002/0116625 A1 * | 8/2002 | Sato | 713/194 |
| 2003/0097577 A1 * | 5/2003 | Sotoodeh et al. | 713/189 |
| 2004/0098348 A1 * | 5/2004 | Kawasaki et al. | 705/59 |
| 2005/0183072 A1 * | 8/2005 | Horning et al. | 717/140 |
| 2006/0082837 A1 * | 4/2006 | Hiroe et al. | 358/448 |
| 2008/0005476 A1 | 1/2008 | Venkatesan et al. | |
| 2008/0060085 A1 | 3/2008 | Samzelius et al. | |
| 2009/0187771 A1 * | 7/2009 | McLellan, Jr. | 713/193 |

(Continued)

FOREIGN PATENT DOCUMENTS

| | | |
|---|---|---|
| EP | 1884873 | 2/2008 |
| EP | 2075728 | 7/2009 |
| JP | 2004180318 | 6/2004 |

(Continued)

OTHER PUBLICATIONS

Christian Collberg and Clark Thomborson. Watermarking, Tamper-Proofing, and Obfuscation—Tools for Software Protection, IEEE Transactions on Software Engineering 28:8, 735-746, Aug. 2002.

(Continued)

*Primary Examiner* — Samson Lemma
*Assistant Examiner* — Wayne An
(74) *Attorney, Agent, or Firm* — Tutunjian & Bitetto, P.C.

(57) ABSTRACT

A device stores program code in a plurality of slots in its memory. When a processor of the device receives a call to an encrypted function, it uses a slot table to find the location of the cipher function and the cipher module and the key to decrypt the encrypted module. The encrypted module is decrypted, executed, re-encrypted and moved to a new memory slot. The cipher function used is moved to a further new slot and the slot table is updated. Also provided is a method and a computer program support. The invention can make it more difficult to analyse execution traces of the program code.

20 Claims, 6 Drawing Sheets

(56) References Cited

U.S. PATENT DOCUMENTS

2010/0088389 A1* 4/2010 Buller et al. .................. 709/216
2013/0145177 A1* 6/2013 Cordella et al. ............. 713/193

FOREIGN PATENT DOCUMENTS

| KR | 2009072623 | 7/2009 |
| WO | WO9858322 | 12/1998 |
| WO | WO0031916 | 6/2000 |
| WO | WO2004105307 | 12/2004 |
| WO | WO2008057694 | 5/2008 |

OTHER PUBLICATIONS

Danny Quist and Lorie Liebrock. Reverse Engineering by Crayon, Game Changing Hypervisor Based Malware Analysis and Virtualization. Blackhat USA 2009 Cited in the Application by Patent Councel. Search Report Dated Sep. 5, 2012.
UPX—http://fr.wikipedia.org/wiki/UPX—Retrieved on Dec. 5, 2014.
Desclaux, Philippe Biondi Fabrice. "Silver Needle in the Skype." (2006). Retrieved from http://www.oklabs.net/wp-content/uploads/2012/06/bh-eu-06-Biondi.pdf.

* cited by examiner

METHOD, A DEVICE AND A COMPUTER PROGRAM SUPPORT FOR EXECUTION OF ENCRYPTED COMPUTER CODE

This application claims the benefit, under 35 U.S. §119 of European Patent Application 12305667, filed Jun. 12, 2012.

TECHNICAL FIELD

The present invention relates generally to software, and in particular to run-time decryption of encrypted software code.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is relatively common for software providers to protect the confidentiality of computer program software code. One reason is that the code comprises secret knowledge. Another reason is that the code was complex and costly to develop and that the developers want to hinder others from copying parts of the code for insertion in their programs. A further reason is that the developers wish to keep hackers from understanding the software as a pre-emptive defense against attacks.

A basic method of protecting confidentiality is to use encryption. The code is encrypted after the link at build time and decrypted at load time or during execution at running time. This solution works very well if a so-called cryptoprocessor is used to ensure confidentiality. Such processors are however both expensive, slow and not wide-spread.

Encryption works in a slightly different manner on a generic processor. It is, for example, normally not possible to encrypt the entire program code as at least one part (called the loader) of the code must be kept unencrypted in order to provide decryption of the remainder. On a generic processor, encryption provides good protection against static attacks, but it is vulnerable to dynamic analysis, as will be seen.

A further solution is obfuscation, see e.g. Christian Collberg and Clark Thomborson. Watermarking, Tamper-Proofing, and Obfuscation—Tools for Software Protection, IEEE Transactions on Software Engineering 28:8, 735-746, August 2002. Obfuscation may be said to comprise complicating the code so that it is difficult to understand. It provides good protection against static analysis, but it is very weak against dynamic analysis. In essence, obfuscation merely aims to slow down a hacker's work. Moreover, program performances decrease with obfuscation efficiency.

A typical attack on encrypted code is dynamic analysis: the code is dumped during execution since the code must be deciphered to be executed, which means that the executed code may be analysed.

A first technique to improve the security of code encryption is to decrypt only a small chunk of code, execute the decrypted code and then re-encrypt the chunk of code. This means that decrypted code is present in the memory only during a short time. However the implementation of this protection often comprises decrypting the code at an address chosen by the compiler. If an attacker detects encrypted code, it is easy to use a hardware breakpoint, execute the code and dump it when the hardware breakpoint is reached.

The inventors have provided a countermeasure in EP2075728, which describes a solution in which each code chunk is decrypted in a randomly selected address in the memory. The countermeasure makes it more difficult for an attacker to use breakpoints in the deciphered code: even if a breakpoint provides information about a protected function during one execution, the function will be executed at a different address the next time, which makes it more difficult to analyse the function.

However, the arrival of new tools—see e.g. Danny Quist and Lorie Liebrock. Reverse Engineering by Crayon, Game Changing Hypervisor Based Malware Analysis and Virtualization. Blackhat USA 2009—allows building huge execution traces. It is thus possible to find some pattern in the trace that corresponds to the execution of the encrypted code chunk. In the trace, the attacker can then notice that a particular module is executed before each execution of the encrypted chunk of code. This module is the decryption module, identification of it is a significant advance for the attacker: a breakpoint at the end of the decryption module enables dumping each encrypted code chunk before its execution.

It will thus be appreciated that there is a need for a solution that provides an improved protection of encrypted software code that makes it more difficult to analyse execution traces. The present application provides such a solution.

SUMMARY OF INVENTION

In a first aspect, the invention is directed to a method of executing program code located in a memory comprising a plurality of memory slots. The program code comprises an encrypted function in a first memory slot. A processor decrypts an encrypted function using a first cipher module and a first key to obtain a decrypted function; executes the decrypted function; re-encrypts the decrypted function using a second cipher module and a second key to obtain a re-encrypted function; and stores the re-encrypted function in a second memory slot, different from the first memory slot.

In a first preferred embodiment, the second cipher module is different from the first cipher module.

In a second preferred embodiment, the second key is different from the first key.

In a third preferred embodiment, the processor further moves the second cipher module from a third memory slot to a fourth memory slot after the re-encryption step.

In a fourth preferred embodiment, the processor keeps a memory slot list comprising information on contents of the plurality memory slots and updates the memory slot list after the storing step.

In a fifth preferred embodiment, at least one of the first cipher module and the second cipher module is selected from a plurality of cipher modules implementing the same cipher algorithm. It is advantageous that at least two of the plurality of cipher modules implementing the same cipher algorithm have been implemented in different ways.

In a sixth preferred embodiment, the processor deletes the decrypted function after its execution.

In a second aspect, the invention is directed to a device for executing program code. The device comprises a memory comprising a plurality of memory slots storing at least an encrypted function of the program code in a first memory slot. The device further comprises a processor configured to: decrypt an encrypted function using a first cipher module and a first key to obtain a decrypted function; execute the decrypted function; re-encrypt the decrypted function using a second cipher module and a second key to obtain a re-encrypted function; and store the re-encrypted function in a second memory slot, different from the first memory slot.

In a first preferred embodiment, the second cipher module is different from the first cipher module.

In a second preferred embodiment, the processor is further configured to move the second cipher module from a third memory slot to a fourth memory slot after re-encryption.

In a third preferred embodiment, the processor is further configured to keep a memory slot list comprising information on contents of the plurality memory slots and to update the memory slot list after the storing the re-encrypted function.

In a fourth preferred embodiment, the processor is further configured to select at least one of the first cipher module and the second cipher module from a plurality of cipher modules implementing the same cipher algorithm.

In a fifth preferred embodiment, the processor is further configured to delete the decrypted function after its execution.

In a third aspect, the invention is directed to a non-transitory computer program support storing thereon instructions that, when executed by a processor, performs the method of the first aspect.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
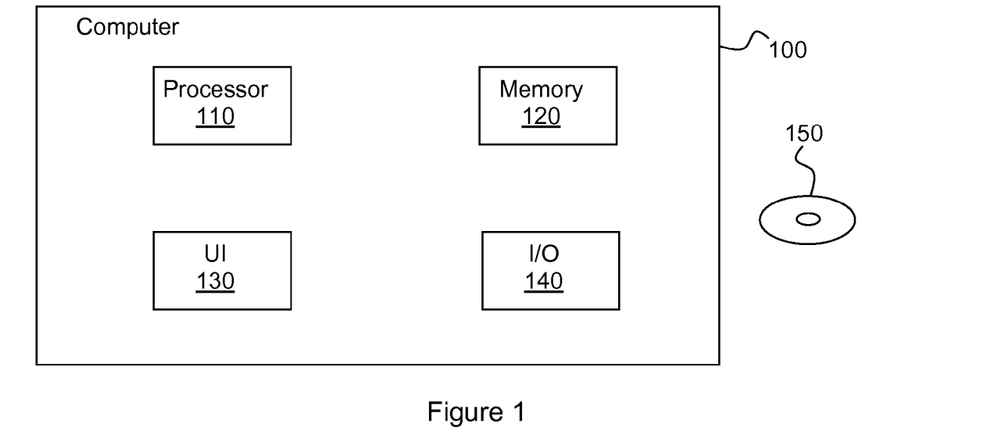
FIG. 1 illustrates an exemplary computing device on which the invention may be implemented.

FIG. 1 illustrates an exemplary computing device ("computer") 100 on which the invention may be implemented. The computer 100 can be any kind of suitable computer or device capable of performing calculations, such as a standard Personal Computer (PC). The computer 100 comprises at least one processor 110, RAM memory 120, a user interface 130 for interacting with a user, and a second interface 140 for reading a software program for performing the method of the invention from a digital data support 150. The skilled person will appreciate that the illustrated computer is very simplified for reasons of clarity and that a real computer in addition would comprise features such as network connections and persistent storage devices.

To provide improved confidentiality of software code, the present invention provides a self-modifying method that uses three types of modules—encrypted modules, cipher modules for decrypting the encrypted modules, and decrypted modules ready to be executed—located in so-called slots in the memory, wherein the processor performing the method modifies and shuffles the slots as will be further described hereinafter.

A plurality of cipher modules are used and randomness is used to determine the address of the encrypted code. This means that even if an attacker finds one cipher module, it is not possible to find all the encrypted code chunks. Indeed, it is proposed to select the cipher module to use for decryption randomly and to move the cipher module after use. Then it becomes much more difficult to find a relevant pattern in the execution trace.

The present invention comprises:

A plurality of cipher modules that may have the same behaviour, although it is preferred to have a plurality of groups of cipher modules where the behaviour varies between groups. The cipher modules (within a group) preferably have different implementations to avoid patterns in the execution trace. Obfuscation may be used to obtain the different implementations.

A first table, "crypto table", that comprises the addresses of the different cipher modules.

A second table, "slot table", that comprises a list of the contents of the slots.

Figure 2:
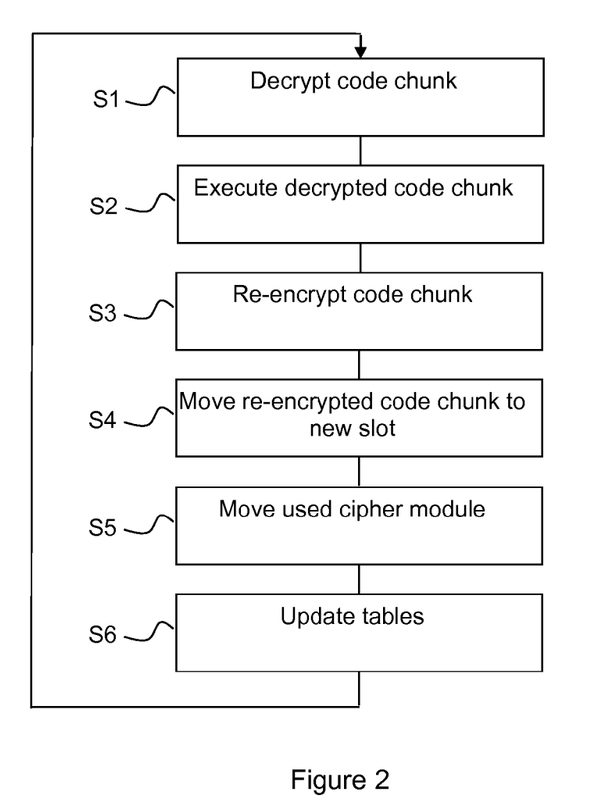
FIG. 2 illustrates a method of execution of encrypted code according to the present invention.

FIG. 2 illustrates a method of execution of encrypted code according to the present invention. The method is performed by the processor 110 and the different parts (functions and modules) of code are stored in the memory 120. When a call is made to a function, the slot table is read to find the location of the function in the memory. It is further possible to read the cipher module and the key to be used for the decryption. (It is to be noted that when a symmetric encryption algorithm is used, encryption and decryption are the same.) The cipher module is then chosen (preferably randomly if a choice is possible) and its location is obtained from the crypto table.

The cipher module then decrypts S1 the encrypted function and puts the decrypted function in a, preferably randomly, chosen empty slot in the memory. It will be appreciated that the slot may be chosen by the cipher module or provided as input to it.

The decrypted function is executed S2 in its slot and then re-encrypted S3 by an encryption function (preferably randomly chosen), not necessarily the one used for decryption, using an encryption key, preferably a different one than the one used for decryption. The function is preferably re-encrypted function in a different slot that the slot in which the encrypted function was stored and the encrypted function and the decrypted function are deleted; in other words, the function is moved S4 to a new slot.

The cipher module is then moved S5 to a new, preferably randomly chosen, slot. The crypto table and the slot table are updated S6 to reflect the changes made. The method may then go through further iterations for further encrypted functions.

It will be appreciated that the cipher module may be encrypted when it is not used and that it thus should be decrypted before use and re-encrypted after use (possibly using another encryption algorithm than the one used for decryption—the key may also be different).

Figure 3A:
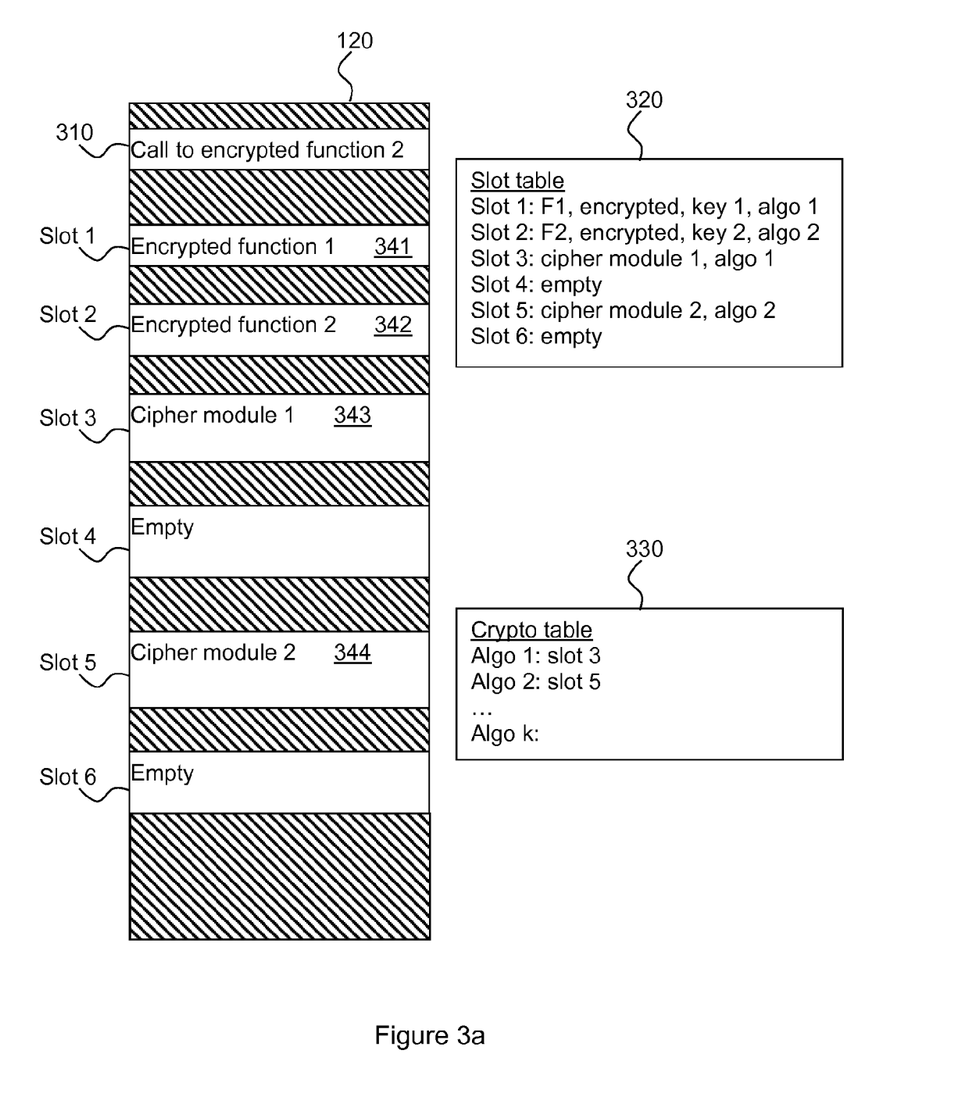
FIGS. 3a-3e (which may jointly be referred to as FIG. 3) further illustrate an iteration of the method according to the invention.

FIGS. 3a-3e (which may jointly be referred to as FIG. 3) further illustrate an iteration of the method according to the invention. FIG. 3a shows the memory 120 with a call 310 to encrypted function 2, six slots Slot 1-Slot 6, a slot table 320 storing information about the slots and a crypto table 330. Slot 1 contains encrypted function 1 341, Slot 2 encrypted function 2 342, Slot 3 cipher module 1 343 and Slot 5 cipher module 2 344, while Slot 4 and Slot 6 are empty.

When the call 310 to encrypted function 2 comes, the slot table 320 is consulted to find in which slot it is located and what encryption algorithm and encryption key were used. In the example, a single cipher module implements algorithm 1 and a single cipher module implements algorithm 2, but it will be appreciated that it is possible to have a plurality of cipher modules implement the same algorithm (as mentioned, preferably obfuscated in different ways to behave differently). The slot table 320 returns the information that encrypted function 2 resides in Slot 2 and that it has been encrypted using encryption algorithm 2 and key 2. It is further determined that an cipher module (cipher module 2) implementing algorithm 2 resides in Slot 5. Cipher module 2 is then executed to decrypt (S1 in FIG. 2) encrypted function 2 in a randomly determined empty slot, in the example Slot 6.

Figure 3B:
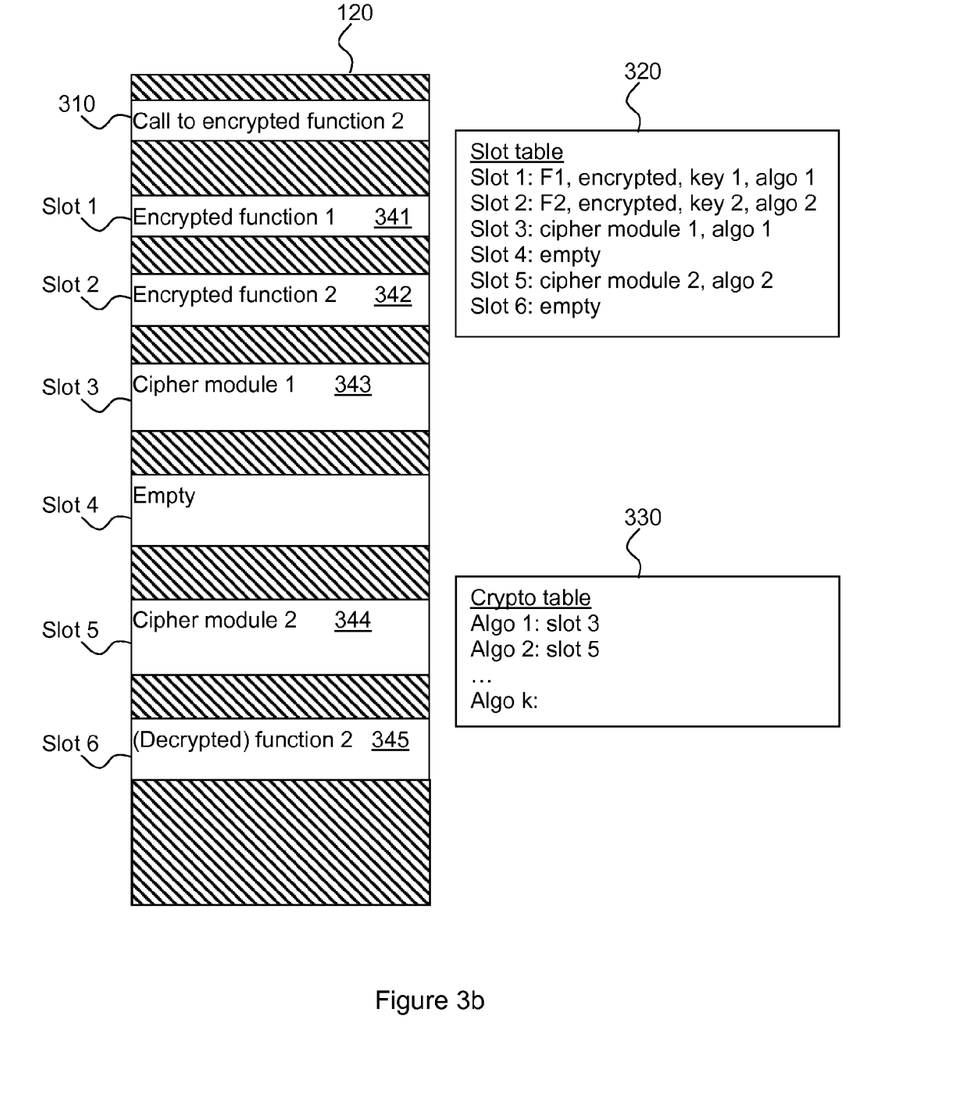
Figure 3C:
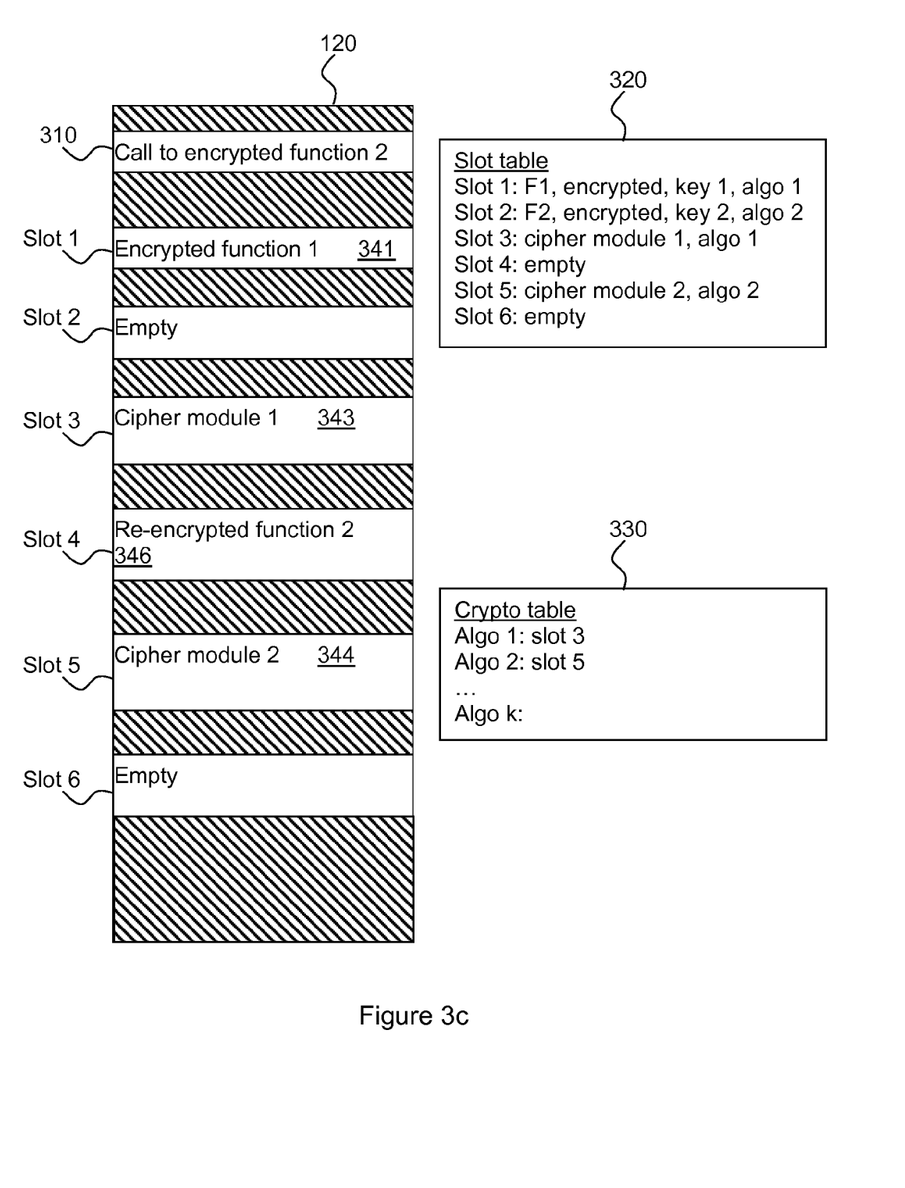

FIG. 3b shows the memory after decryption: encrypted function 2 is in Slot 2 and decrypted function 2 (or just "function 2") is in Slot 6. Function 2 is then executed in Slot 6 (S2 in FIG. 2). When the execution is over, function 2 is re-encrypted (S3 in FIG. 2) in a randomly chosen empty slot, in the example Slot 4. The initial encrypted function 2 in Slot 2 and decrypted function 2 in Slot 6 are empty. FIG. 3c shows the memory 120 after the move (S4 in FIG. 2) of function 2.

Figure 3D:
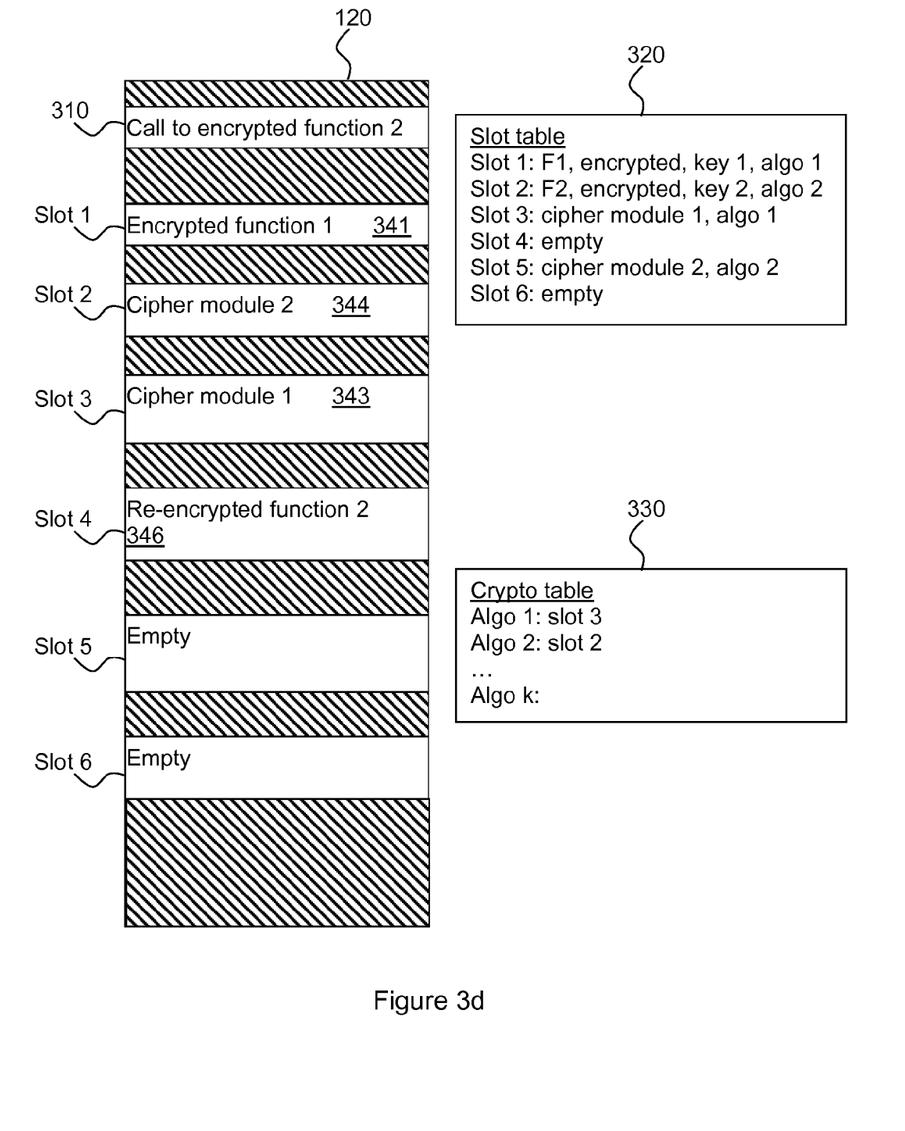

Cipher module 2 is then moved (S5 in FIG. 2) to a randomly chosen empty slot, in the example Slot 2 and it is deleted from its previous slot, Slot 5. FIG. 3d shows the memory 120 after the move of cipher module 2.

Figure 3E:
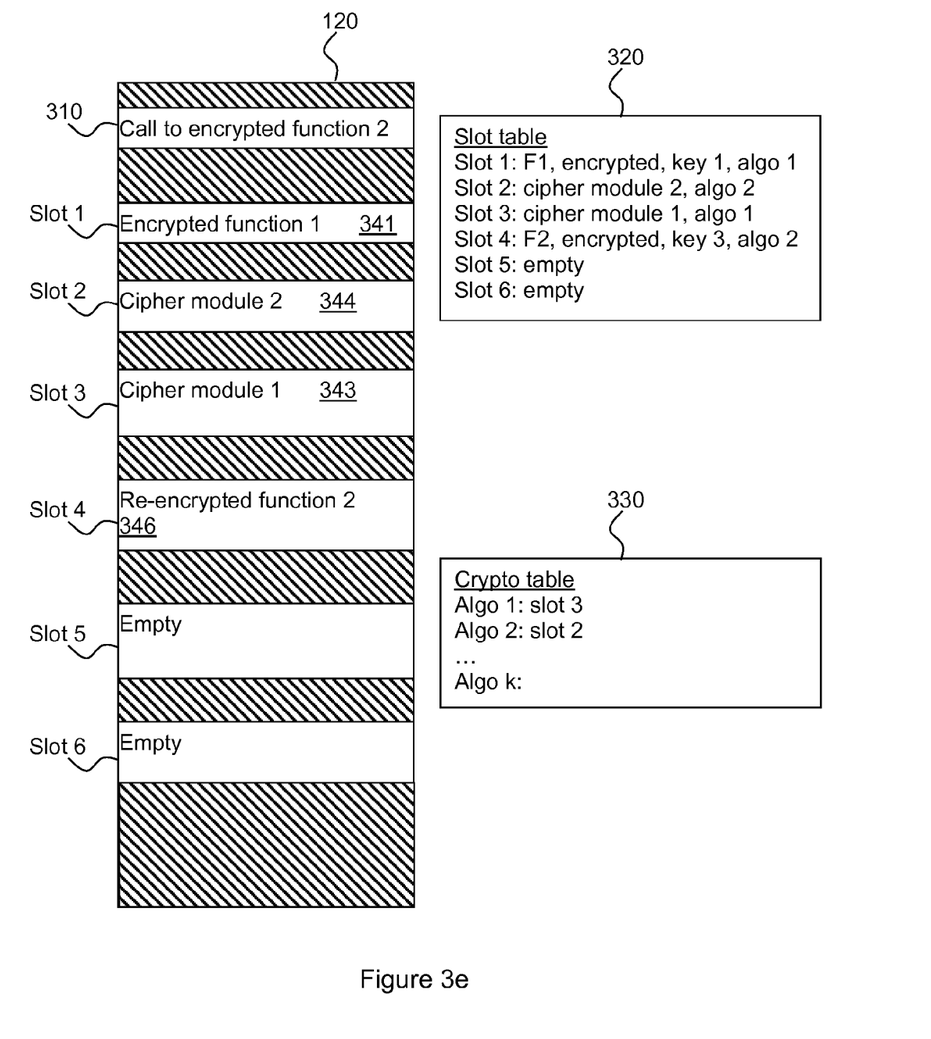

Finally, the tables are updated (S6 in FIG. 2) to take the changes into account; the resulting slot table is shown in FIG. 3e.

In the example illustrated in FIG. 3, the same cipher module was used for decryption and re-encryption of function 2. It will however be appreciated that it is possible, even preferred, to use one cipher module for the decryption and a different cipher module for the re-encryption. It is advantageous to move each cipher module to an empty slot after its use.

Expressed in a more general manner, the method according to a preferred embodiment of the present invention may be expressed as follows. A plurality of protected modules are encrypted using different cipher modules (a different module for each protected module or at least one cipher module was used for a plurality of protected modules). When the execution of the software code reaches a protected module the processor performs the following steps:
1. Cipher module $C_i$ corresponding to the protected module is called to decipher the protected module. The slot table allows finding the cipher module $C_i$ to use to decrypt the protected module and the address of the cipher module may be found using the crypto table.
2. Cipher module $C_i$ determines an available (i.e. empty) slot $S_{i+1}$ in which to decrypt the protected module. The code of the protected module is decrypted at a random address in this slot $S_{i+1}$ using the key $K_i$.
3. The protected module is executed at the random address in slot $S_{i+1}$.
4. Cipher module $C_i$ randomly chooses a new key $K_{i+1}$, a second cipher module $C_{i+1}$ and an available slot $S_{i+2}$ in which to (re-)encrypt the protected module.
5. The protected module is encrypted in slot $S_{i+2}$ at a randomly chosen address using the algorithm corresponding to $C_{i+1}$ and the key $K_{i+1}$.
6. The code in slots $S_i$ and $S_{i+1}$ is erased.
7. Cipher module $C_i$ is moved to a random address in an available slot, slot $S_{i+3}$.
8. The address of cipher module $C_i$ is updated in the crypto table.
9. The slot table is modified so that a call to the protected module uses the correct cipher module and the correct key.
10. The slots $S_{i+1}$ and $S_i$ are set to empty in the slot table.

The skilled person will also appreciate that the method of the present invention can increase the resistance against attacks using dynamic analysis based on execution traces resulting from hardware breakpoints.

The skilled person will appreciate that the expression "random" used herein in practice is to be interpreted as "pseudo-random".

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of executing program code located in a memory having a plurality of memory slots, the program code having an encrypted function in a first memory slot, the method comprising:
   decrypting, by a processor, the encrypted function using a first cipher module located in a second memory slot to obtain a decrypted function;
   executing, by the processor, the decrypted function;
   re-encrypting, by the processor, the decrypted function using a second cipher module located in a third memory slot to obtain a re-encrypted function;
   storing, by the processor, the re-encrypted function in a fourth memory slot, different from the first memory slot; and
   moving, by the processor, the second cipher module from the third memory slot to a fifth memory slot after the re-encryption step, the fifth memory slot being different than the third memory slot.

2. The method of claim 1, wherein the second cipher module is different from the first cipher module.

3. The method of claim 1, wherein the first cipher module further comprises a first key and the second cipher module comprises a second key, wherein the second key is different from the first key.

4. The method of claim 1, further comprising:
   maintaining, by the processor, a memory slot list having information on contents of the plurality memory slots; and
   updating, by the processor, the memory slot list after the storing step.

5. The method of claim 1, further comprising selecting at least one of the first cipher module and the second cipher module from a plurality of cipher modules implementing the same cipher algorithm.

6. The method of claim 5, wherein at least two of the plurality of cipher modules implementing the same cipher algorithm are implemented in different ways.

7. The method of claim 1, further comprising deleting, by the processor, the decrypted function after its execution.

8. A device for executing program code having an encrypted function, the device comprising:
   a memory having a plurality of memory slots, the encrypted function being stored in a first memory slot, and
   a processor configured to:
      decrypt an encrypted function using a first cipher module located in a second memory slot to obtain a decrypted function;
      execute the decrypted function;
      re-encrypt the decrypted function using a second cipher module located in a third memory slot to obtain a re-encrypted function;
      store the re-encrypted function in a fourth memory slot, different from the first memory slot; and
      move the second cipher module from the third memory slot to a fifth memory slot after re-encryption, the fifth memory slot being different than the third memory slot.

9. The device of claim 8, wherein the second cipher module is different from the first cipher module.

10. The device of claim 8, wherein the processor is further configured to:

maintain a memory slot list having information on contents of the plurality of memory slots; and update the memory slot list after the storing the re-encrypted function.

11. The device of claim 8, wherein the processor is further configured to select at least one of the first cipher module and the second cipher module from a plurality of cipher modules implementing the same cipher algorithm.

12. The device of claim 8, wherein the processor is further configured to delete the decrypted function after its execution.

13. A non-transitory computer readable storage medium having stored therein instructions enabling executing program code located in a memory having a plurality of memory slots, the program code having an encrypted function in a first memory slot, such that when the instructions are executed by a computer, the instructions cause the computer to:

decrypt, by a processor, the encrypted function using a first cipher module located in a second memory slot to obtain a decrypted function;

execute, by the processor, the decrypted function;

re-encrypt, by the processor, the decrypted function using a second cipher module located in a third memory slot to obtain a re-encrypted function;

store, by the processor, the re-encrypted function in a fourth memory slot, different from the first memory slot; and move, by the processor, the second cipher module from the third a memory slot to a fifth memory slot after the re-encryption step, the fifth memory slot being different than the third memory slot.

14. The device of claim 8, wherein the first cipher module further comprises a first key and the second cipher module comprises a second key, wherein the second key is different from the first key.

15. The computer readable storage medium according to claim 13, wherein the second cipher module is different from the first cipher module.

16. The computer readable storage medium according to claim 13, wherein the first cipher module further comprises a first key and the second cipher module comprises a second key, wherein the second key is different from the first key.

17. The computer readable storage medium according to claim 13, wherein the instructions further cause the computer to:

maintain, by the processor, a memory slot list having information on contents of the plurality memory slots; and update, by the processor, the memory slot list after the storing step.

18. The computer readable storage medium according to claim 13, wherein the instructions further cause the computer to select at least one of the first cipher module and the second cipher module from a plurality of cipher modules implementing the same cipher algorithm.

19. The computer readable storage medium according to claim 18, wherein at least two of the plurality of cipher modules implementing the same cipher algorithm are implemented in different ways.

20. The computer readable storage medium according to claim 13, wherein the instructions further cause the computer to delete, by the processor, the decrypted function after its execution.

* * * * *